United States Patent [19]
van der Lely

[11] 3,931,859
[45] Jan. 13, 1976

[54] CONVERTIBLE AGRICULTURAL IMPLEMENTS AND MACHINES

[76] Inventor: Cornelis van der Lely, 7, Bruschenrain, Zug, Switzerland

[22] Filed: Mar. 13, 1974

[21] Appl. No.: 450,670

[30] Foreign Application Priority Data
Mar. 14, 1973  Netherlands.................... 7303531

[52] U.S. Cl. .................. 172/247; 56/2; 56/13.6; 56/503
[51] Int. Cl.² ............... A01B 63/00; A01D 49/00
[58] Field of Search ............. 172/59, 245, 249, 253, 172/247; 56/2, 6, 13.6, 503

[56] References Cited
UNITED STATES PATENTS

| | | | |
|---|---|---|---|
| 2,612,017 | 9/1952 | Jarmin | 56/503 |
| 2,701,942 | 2/1955 | Caldwell et al. | 56/503 X |
| 2,777,272 | 1/1957 | Smith et al. | 172/59 |
| 2,782,585 | 2/1957 | Hervey | 56/13.6 X |
| 3,343,355 | 9/1967 | Freedlander et al. | 56/295 |
| 3,391,522 | 7/1968 | Zweegers | 56/6 |
| 3,477,214 | 11/1969 | Rogers | 56/295 |
| 3,638,539 | 2/1972 | Lewis | 172/59 X |
| 3,774,688 | 11/1973 | van der Lely et al. | 172/59 X |
| 3,821,989 | 7/1974 | van der Lely et al. | 172/59 |

FOREIGN PATENTS OR APPLICATIONS
6,410,908   3/1965   Netherlands.......................... 172/59

*Primary Examiner*—Stephen C. Pellegrino
*Attorney, Agent, or Firm*—Mason, Mason & Albright

[57] ABSTRACT

An agricultural implement is convertible from a soil tilling cultivator having a row of detachable soil working members having rotatable supports by removing some or all of the soil working tools and attaching mowing or cutting tools having one or more horizontally extending blades, to only some of the rotatable supports, at spaced apart intervals along the row. The bladed tools have detachable carriers and each of the tools has at least one group of blades with leading edges that are rotated in circular paths which overlap the paths of those blades on adjacent tools. The rotary tools can have spaced apart groups of blades at different vertical levels and guide surfaces or further cutting or mowing elements mounted between adjacent tools. Also, the bladed tools can be fastened to alternate supports or every third support to rotate in the same or opposite directions from adjacent bladed tools.

23 Claims, 9 Drawing Figures

CONVERTIBLE AGRICULTURAL IMPLEMENTS AND MACHINES

According to one aspect of the invention, there is provided a method for the conversion of a cultivating implement into a mowing/cutting machine, such implement comprising a plurality of tools arranged in side-by-side relationship so that each tool is rotatable about a corresponding upwardly extending axis in a direction opposite to that of the or each of its immediate neighbours with each tool having, or being capable of being provided with, at least one said working member, wherein the method comprises the steps of removing the working members from some or all of the tools and replacing at least some of the working members by a plurality of cutting or mowing members arranged to co-operate with each other or with further cutting or mowing members when the converted machine is in operation.

For a better understanding of the invention, and to show how the same may be carried into effect, reference will now be made, by way of example, to the accompanying drawings, in which.

Referring to FIGS. 1 to 6 of the drawings, the implement which is illustrated is basically a soil cultivating implement or rotary harrow but is shown converted for use as a mowing or cutting machine in accordance with the invention. The implement or machine has a frame part 1 that extends substantially horizontally and normally perpendicular, but at least transverse, to the intended direction of operative travel of the implement or machine that is indicated by an arrow A in FIG. 1 of the drawings. The frame part 1 is in the form of a hollow beam which comprises a lower portion 2 that is of substantially channel-shaped cross-section having upwardly divergent limbs whose uppermost edges are bent over to form substantially horizontal rims that project forwardly and rearwardly, respectively, relative to the direction A. The rims which have just been mentioned are interconnected by a substantially flat cover plate 3, a plurality of small bolts, being employed to secure said cover plate 3 to the rims of the lower portion 2. If considered necessary, the single cover plate 3 may be replaced by two or more separate but adjoining cover plates. The opposite ends of the hollow beam which affords the frame part 1 are closed by substantially vertical plates 4. Upwardly extending, and normally substantially vertical, shafts 5 are rotatably mounted in the frame part 1 at regular intervals therealong which are preferably such that said shafts are spaced apart from one another by distances of substantially 25 centimeters. There are twelve of the shafts 5 in the example which is being described and each shaft 5 is rotatably mounted in a corresponding lower bearing 7 carried by the lower portion 2 of the frame part 1 and a corresponding upper bearing 8 carried by the cover plate 3. Each shaft 5 projects downwardly beneath the corresponding lower bearing 7 and its lowermost end has a corresponding substantially horizontally extending support 9 rigidly secured to it. Central regions of the supports 9 are rigidly secured to the lowermost ends of the shafts 5 and the opposite ends of said supports have substantially vertically extending sleeves rigidly secured to them to afford holders 10 for releasable portions of tools 6 such as soil working tines (not illustrated) or mowing or cutting members such as those that will be described below. The substantially vertical center lines or longitudinal axes of the sleeve-like holders 10 are parallel or substantially parallel to the axes of rotation that coincide with the longitudinal axes of the corresponding shafts 5. The holders 10 afford parts of fastening means by which the aforementioned releasable portions of twelve (in the example which is being described) tools 6 can quickly and easily be mounted on, or removed from, the remainder of the implement or machine.

When the implement or machine of FIGS. 1 to 6 of the drawings is arranged to function as a soil cultivating implement or rotary harrow, the releasable portions of the tools 6 will be afforded principally by pairs of tines (not shown) having fastening portions releasably fixed in the holders 10. Each shaft 5 is provided, inside the hollow frame part 1 between the corresponding lower and upper bearings 7 and 8, with a straight- or spur-toothed pinion 32, the row of 12 pinions 32 having their teeth in successively intermeshing relationship so that, during operation, each of the 12 shafts 5 will rotate in a direction opposite to that of its neighbour or each of its neighbours. However, when the implement or harrow is converted for use as a mowing or cutting machine as illustrated in the drawings, all of the tines (not shown) are removed and every alternate pair of tines is replaced by a cutting or mowing member 11 which comprises blades 13 that project substantially horizontally and substantially radially with respect to the axis of rotation of the corresponding shaft 5. Each of the shafts 5 that indirectly carries cutting or mowing members 11 rotates in the same direction B (FIG. 4) during operation with the result that, in a region of overlap between the circles traced by the outermost free ends or tips of the blades 13 of neighbouring members 11, said blades move in opposite directions. This will be evident from an examination of FIG. 4 of the drawings. The leading edge of each blade 13 with respect to the direction of rotation B is formed as a knife edge 14 and thus, in the regions of overlap which have just been mentioned, said knife edges 14 will move in opposite directions in cutting and chopping co-operation. The knife edge 14 at the front of each blade 13 with respect to the direction B has its radially outermost end curved rearwardly through 90° to merge into the rearmost (with respect to the same direction B)

edge of the corresponding blade 13 that is not a sharpened edge.

Each cutting or mowing member 11 comprises a circular carrier disc 12 to which the corresponding blades 13, of which there are four, are secured in cruciform relationship by pairs of bolts 11A. It will be noted from FIG. 4 of the drawings that each cutting or mowing member 11 is turned angularly through substantially 45° around the corresponding axis of rotation as compared with its neighbour or both of its neighbours. Six of the 12 tools 6 are provided with cutting or mowing members 11 and those six members 11 are of alternately different constructions. As can be seen best in FIG. 3 of the drawings, one member 11 has a single set of four blades 13 while its neighbour, or each of its neighbours, has two vertically spaced apart sets of four blades 13 each. The blades 13 of the member 11 having only a single set thereof are located at a horizontal level substantially midway between the levels corresponding to the sets of blades 13 of the or each neighbouring member 11 of that kind. Each cutting or mowing member 11 that has only a single set of four blades 13 has its single central carrier disc 12, whose diameter is substantially half that of the diameter of the circle traced by the tips of the corresponding set of blades 13 during rotation, fastened to the lower end of a stub shaft 15 whose upper end, in turn, is welded or otherwise secured to a central region of a substantially horizontally extending strip-shaped support 16. Opposite end regions of each strip-shaped support 16 are formed with holes through which corresponding bolts 17 are entered, said bolts 17 also being passed axially upwards through the pair of holders 10 of the support 9 of the corresponding tool 6. Although not absolutely essential, it is preferred that each bolt 17 should be surrounded, between the upper surface of the corresponding strip-shaped support 16 and the lower end of the corresponding holder 10, by a clamping member 18 whose upper end tapers conically to match a conical taped formed internally of the lower end of the sleeve-like holder 10 in question. A screwthreaded portion at the free end of the shank of each bolt 17 receives a co-operating nut 19 which is of a self-centering construction exhibiting a conical abutment face which co-operates with a matching conical abutment face of the mouth at the upper end of each holder 10. If desired, the nuts 19 may incorporate inserts designed to engage the conical surfaces of the holders 10 frictionally so as to tend to prevent vibration during operation from working the nuts loose. Once the nuts 19 have been tightened, a rigid assembly is formed which is very resistant to loosening during operation but which can readily be disassembled and/or reassembled when required.

Figure 4:
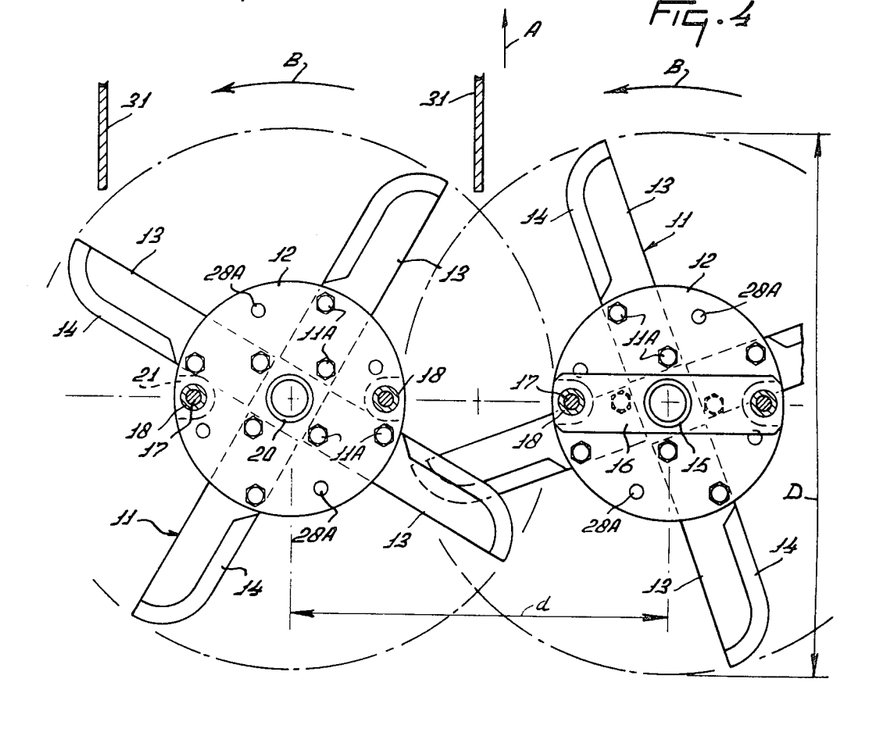
FIG. 4 is a section taken on the line IV—IV of FIG. 3.

Each tool 6 whose releasable portions comprise a cutting or mowing member 11 having two sets of blades 13 has two vertically spaced apart central carrier discs 12 that are welded or otherwise rigidly secured to opposite end regions of a corresponding stub shaft 20. In order that the lower carrier disc 12 shall not prevent installation and removal of the corresponding pair of bolts 17, that disc is formed at two locations which are diametrically opposite with respect to the corresponding axis of rotation with recesses 21 (FIG. 4). In this case, the upper carrier disc 12 is directly engaged by the heads of the corresponding pair of bolts 17 and is accordingly formed with a pair of holes corresponding to those at opposite end regions of the previously described strip-shaped support 16. The releasable co-operation with the fastening means afforded by the sleeve-like holders 10 is otherwise similar to that which has been described above for each member 11 having only a single set of blades 13. The vertical spacing between the two sets of blades 13 of each member 11 of that kind should not be less than 2 centimeters and not more than 20 centimeters, the preferred spacing being substantially 5 centimeters at which spacing the likelihood of jamming during operation is low while the co-operation between the blades 13 of neighbouring members 11 is very effective for cutting and chopping operations.

Figures 2, 5:
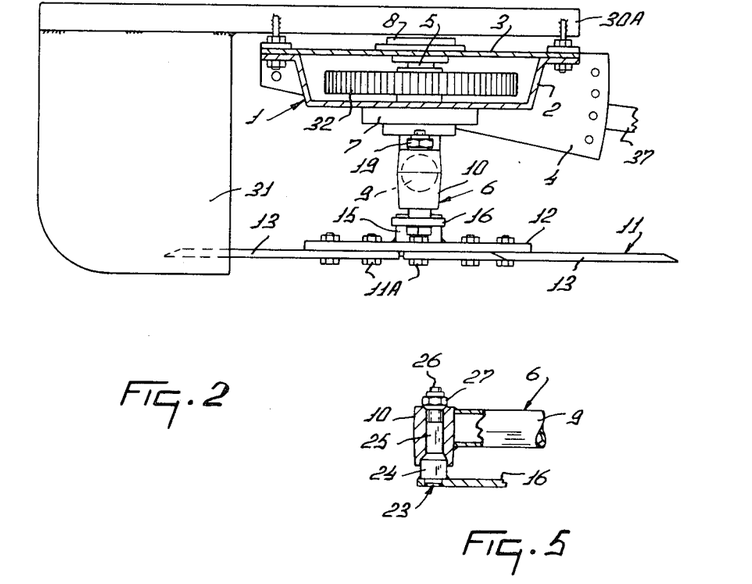
FIG. 2 is a section, to an enlarged scale, taken on the line II—II of FIG. 1.
FIG. 5 is a scrap part sectional elevation illustrating an alternative arrangement to that shown sectionally near the left-hand side of FIG. 3.

FIG. 5 of the drawings illustrates an alternative form of releasable connection between one of the strip-shaped supports 16 and a co-operating holder 10 or, as will be evident from what has been stated above, one of the carrier discs 12. In this modification, the support 16 or equivalent disc 12 has a fastening pin 23 rigidly secured to it, said pin 23 projecting from the upper surface of the strip 16 or disc 12 for co-operation with the appointed holder 10. As can be seen in FIG. 5 of the drawings, the pin 23 is formed, immediately above the support 16 or disc 12, with a shoulder 24 whose upper end is of frusto-conical configuration for co-operation with the internal matchingly shaped surface that is formed near the lower end of the bore through the holder 10. Above the shoulder 14, the pin 23 is successively formed with a plain shank portion 25 and a final screw-threaded shank portion 26. The plain portion 25 has substantially the same diameter as the internal diameter of the holder 10 and thus co-operates therewith to stiffen the final assembly, the length of said portion 25 not being less than half the axial length of the co-operating holder 10. The screwthreaded portion 26 receives a self-centring nut 27 which may be of a similar construction to the previously described nut 19.

Figure 6:
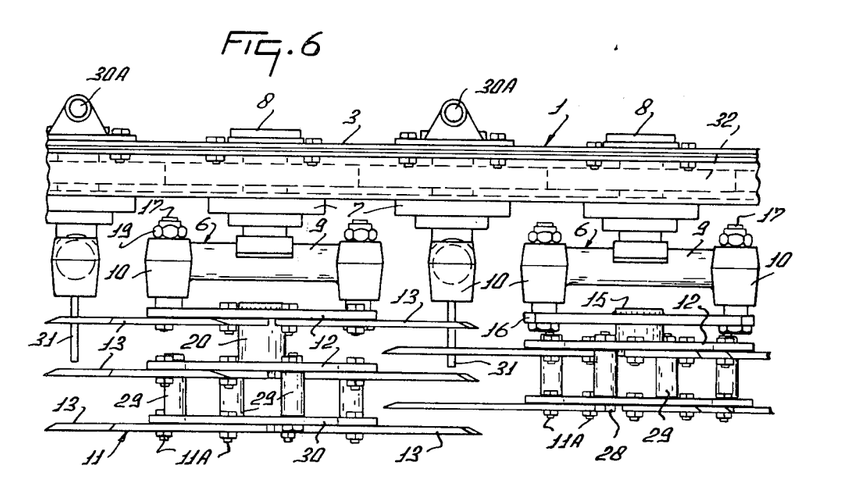
FIG. 6 is a similar view to that of FIG. 3 but illustrates an alternative arrangement of mowing or cutting members.

FIG. 6 of the drawings illustrates a modification in which each of the previously described cutting or mowing members 11 is provided with an additional group or set of four blades 13 so that alternate members 11 along the row of six thereof have two vertically spaced apart groups or sets of blades 13 and three vertically spaced apart groups or sets of blades 13 respectively. The additional groups or sets of blades 13 are secured by further bolts 11A to central circular carrier discs 30, those discs being secured, in turn, to the overlying carrier discs 12 by bolts 28 entered through holes 28A (FIG. 4) in said discs 12 and 30. The required vertical spacing between the additional sets of blades 13 and those that are already provided is attained by surrounding the shanks of the bolts 28 by spacing sleeves 29, said spacing, as discussed above, preferably having a value of substantially 5 centimeters. It will be evident that, if required, one or more further additional sets of blades 13 could be added to the assemblies thereof that are illustrated in FIG. 6 in the manner that has been described with reference to that Figure.

Strip-shaped supports 30A that extend substantially parallel to the direction A are fastened to the top of the cover plate 3 by the same small bolts as connect that cover plate to the underlying lower portion 2 of the frame part 1. There are six of the supports 30A and, as can be seen in the drawings, those supports are arranged in substantially vertical register with the six shafts 5 whose tools 6 have their tines or other releasable portions removed when the soil working implement or rotary harrow is to be converted for use as a mowing or cutting machine. It will be noted that the small bolts by which the supports 30A are connected to the cover plate 3 can quickly be removed to allow said supports to be taken off or replaced as required. The supports 30A project forwardly in the direction A in front of the frame part 1 and the forwardly projecting portion of each of them is provided with a corresponding downwardly depending crop guide 31 in the form of a flat rectangular plate whose plane is substantially parallel to the direction A and whose lowermost and leading corner with respect to that direction is of arcuately curved, rather than angular, configuration. As seen in plan view (FIG. 4), the rearmost extremities of the crop guides 31 with respect to the direction A are located behind leading regions of the circles that are traced by the tips of the blades 13 during rotation of the cutting or mowing members 11, said guides 31 being located, however, substantially in register with and closely adjacent to, the regions of overlap between the circles that have just been mentioned and that correspond to neighbouring members 11. The crop guides 31 between the operative tools 6 substantially prevent cut, mown or chopped crop or other material from being displaced too far by the rapidly rotating blades 13.

One of a central pair of the twelve shafts 5 of the single row thereof has an upward extension into a gear box 33 that is rigidly mounted on top of the frame part 1. The rear of the gear box 33 with respect to the direction A carries a change-speed gear 34 whose construction it is not necessary to describe in detail but which, briefly, comprises alternatively employable pairs of toothed pinions, each pair giving a different transmission ratio between a rotary input shaft 35 of the gear box 33 and the aforementioned upward extension of one of the shafts 5. Thus, by employing the change-speed gear 34, different speeds of rotation of the shafts 5 can be attained in response to a single input speed of rotation applied to the shaft 35. The input shaft 35 projects forwardly from the front of the gear box 33 in substantially the direction A and is splined or otherwise keyed to enable it to be placed in driven connection with the power take-off of an operating agricultural tractor or other vehicle through the intermediary of a telescopic transmission shaft 36 of a construction that is known per se, having universal joints at its opposite ends, in the manner illustrated in outline in FIG. 1 of the drawings.

Figure 1:
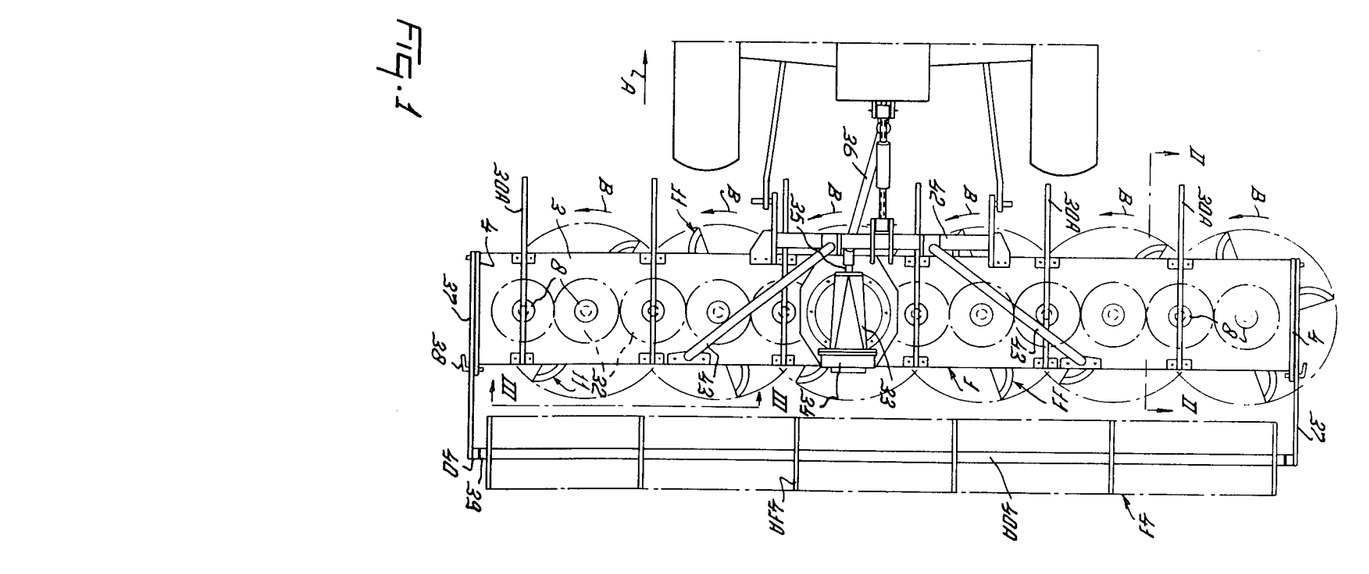
FIG. 1 is a plan view of a soil cultivating implement or rotary harrow converted to function as a mowing or cutting machine in accordance with the invention.

Leading regions of the end plates 4 of the frame part 1 have corresponding arms 37 connected to them by substantially horizontally aligned pivots. The plates 4 are sector-shaped and their rearmost ends with respect to the direction A are formed with curved rows of holes (FIG. 2) whose centers of curvature are coincident with the substantially horizontal pivotal axis that has just been mentioned. The arms 37 formed with holes that can be brought into register with chosen holes in the end plates 4 and horizontal locking pins 38 (FIG. 1) are provided for entry through the holes in the arms 37 and chosen holes in the end plates 4 to maintain said arms 37 in corresponding angular settings about the aligned pivots at the front of the frame part 1. The arms 37 project rearwardly beyond the end plates 4 and their lowermost and rearmost free ends carry horizontal bearings 40 between which a rotary supporting member in the form of a roller 41 is mounted with the aid of stub shafts 39 that are received in said bearings 40. The implement or machine bears against the ground surface, during its operation, by way of the roller 41. The roller 41 has a central shaft 40A that extends between the stub shafts 39 at its opposite ends and said central shaft 40A is provided with a plurality, such as six, of vertical support plates 41A that are spaced apart from one another at regular intervals and whose planes are substantially parallel to the direction A and thus substantially perpendicular to the longitudinal axis of the central shaft 40A. Elongate elements which are not illustrated in the drawings extend between the peripheries of the support plates 41A and may be substantially parallel to the shaft 40A or may be wound helically around that shaft. A generally triangular coupling memeber or trestle 42 is secured to the front of the frame part 1 at a location midway across the width of the implement or machine, upper portions of said coupling member or trestle 42 being rigidly connected to rear regions of the top of the frame part 1 by tie bars 43, said tie bars 43 extending rearwardly from the coupling member or trestle in steeply divergent relationship as seen in plan view (FIG. 1).

Figure 3:
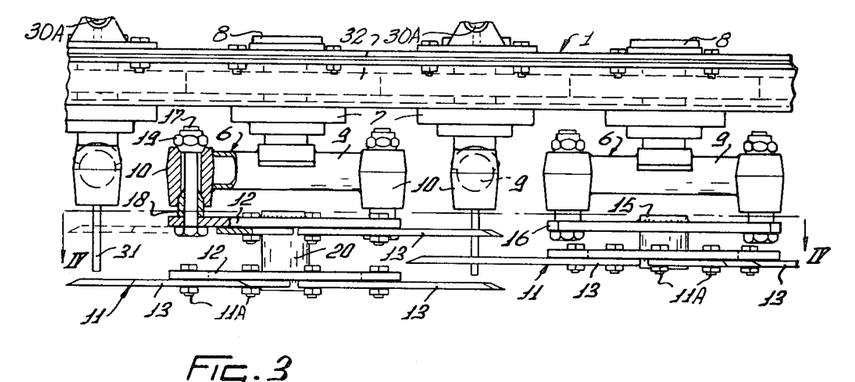
FIG. 3 is a section, to an enlarged scale, taken on the line III—III of FIG. 1.

When the implement or machine that has been described is arranged for use as a cultivating implement or rotary harrow under which conditions all 24 of the holders 10 will be provided with corresponding rigid soil-working tines (not shown), the soil working members that will then form parts of the tools 6 work individual strips of land that overlap one another to produce, in effect, a single broad strip of cultivated or harrowed soil. Such work is normally undertaken principally in connection with the preparation of soil for the sowing of seeds or young plants with the results that an implement or harrow is not convertible in accordance with the features of the present invention may have only one or two short periods of use each year. However, in accordance with the invention, the soil cultivating implement or rotary harrow can quickly and easily be converted for use as a mowing, cutting and/or chopping machine particularly, but not exclusively, suitable for dealing with stalks that are left standing in the field after the harvesting of various crops. The utility of the implement or machine is thus increased and the cost of a machine constructed only to undertake the work which has just been mentioned can, in many cases, be entirely avoided. The conversion is achieved by removing all of the soil-working tines and equipping alternate pairs of holders 10 with cutting or mowing members 11 throughout the whole, or only part, of the width of the machine. The soil-working tines must be removed from at least three of the tools 6 but it is possible, and convenient under some working conditions, to leave some of the tools 6 still provided with their soil working tines, in contradistinction to what has been stated above, so that the implement of machine will be capable of mowing, chopping and/or cutting throughout part of its working width while still tilling the soil throughout a further part of that working width. The blades 13 of neighbouring and co-operating cutting or mowing members 11 are located at different horizontal levels as illustrated in FIGS. 3 and 6 of the drawings and it is noted that it is possible to provide each member 11 with only a single set of blades 13 of neighbouring members 11 will be different. The regions of overlap of the circles traced by the tips of the blades 13 of neighbouring members 11 during rotation thereof are large enough to ensure cutting co-operation between the blades 13 over substantially the whole of the length of the knife edge 14 of each blade (see FIG. 4). In FIG. 4 of the drawings, the diameter of the circle that is traced by the free ends or tips of the blades 13 of each member 11 is indicated by the reference $d$, the distance $d$ preferably having a value of substantially 50 centimeters. The extent of the overlap between each neighbouring pair of members 11 preferably complies with the formula $d/D = 0.85$. As previously mentioned, the implement or machine, when in its converted condition, will often be used for the cutting and chopping of standing stalks in fields. Such stalks usually stand in rows and it is intended that the machine should be steered in such a way that said rows extend substantially midway between the axes of rotation of neighbouring members 11 and thus in register with the regions of overlap of the blades 13 of those members. The crop guides 31 reduce lateral displacement of the cut and/or chopped stalks to a minimum, the cut and/or chopped stalks or other crop being conveyed mainly to the rear of the machine with respect to the direction A.

Figure 7:
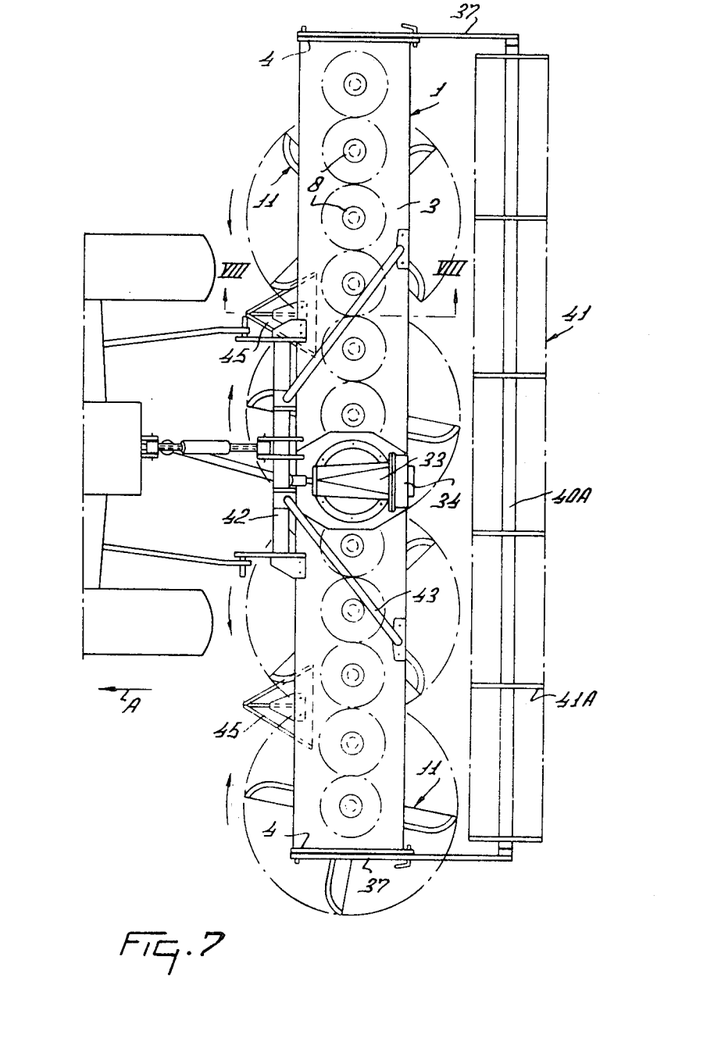
FIG. 7 is a plan view corresponding to FIG. 1 but illustrates an alternative form of conversion of a soil cultivating implement or rotary harrow into a mowing or cutting machine.
Figure 8:
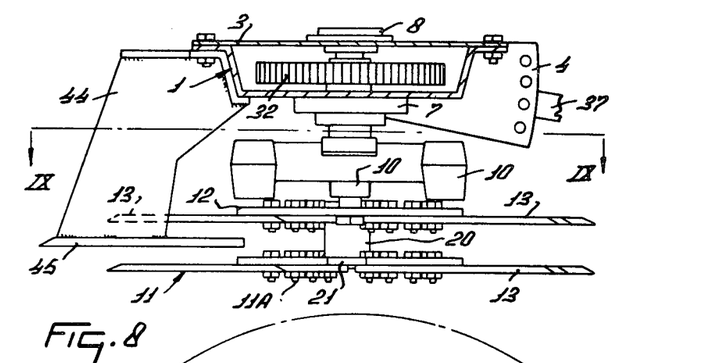
FIG. 8 is a section, to an enlarged scale, taken on the line VIII—VIII of FIG. 7.
Figure 9:
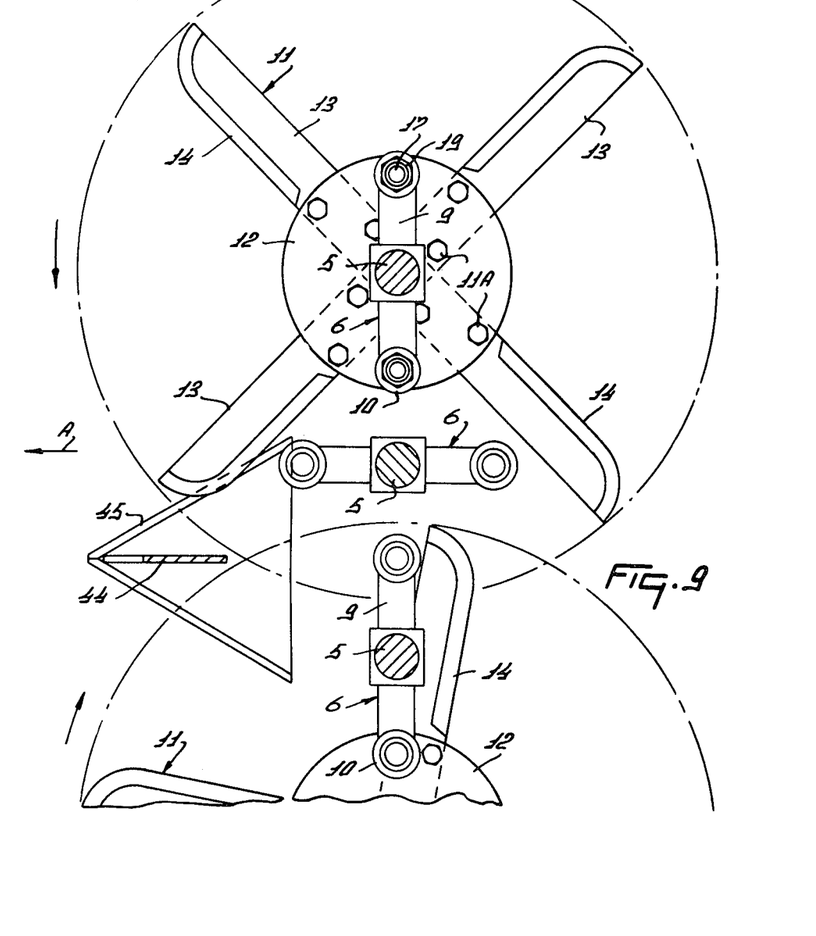
FIG. 9 is a section taken on the line IX—IX of FIG. 8.

FIGS. 7, 8 and 9 of the drawings illustrate an embodiment in which, after the removal of the soil-working tines, only every third tool 6 of the row of twelve thereof is provided with a cutting or mowing member 11. Thus, there are two inoperative tools 6 between each pair of operative tools 6 that is furnished with corresponding cutting or mowing members 11. It will be noted that, with this arrangement, there are four members 11 in the example illustrated in the accompanying drawings with said members 11 being disposed in two co-operating pairs, the members 11 of each pair rotating in relatively opposite directions which are such that, in the regions of overlap between their blades 13, said blades 13 move rearwardly with respect to the direction A. In order to provide the required cutting effect with this arrangement, two further stationary cutting or mowing members 45 are provided for co-operation with the moving blades 13 at locations between the two members 11 of each co-operating pair but towards the front thereof with respect to the direction A. The further members 45 are rigidly but releasably secured to a leading region of the frame part 1 with respect to the direction A by corresponding support brackets 44. Each stationary cutting or mowing member 45 is in the form of a horizontally disposed triangular blade having the two edges thereof which both have a forwardly facing component with respect to the direction A formed as knife edges. The corner of the triangle that coincides with the junction between the two knife edges is directed fowardly with respect to the direction A and is at substantially the same point of progress in that direction as are the leading extremities of the circles traced by the tips of the blades 13 of the four rotary cutting or mowing members 11 (see FIG. 9). Each rotary cutting or mowing member 11 has two sets of blades 13 that are vertically spaced apart from one another along a corresponding stub shaft 20 in the manner that has previously been described. The stationary cutting or mowing members 45 are located at horizontal levels midway between those of the two sets of blades 13 of each member 11 of each pair of such members and it is pointed out that, in this case, the upper sets of blades 13 of each pair of members 11 rotate at a single substantially horizontal level as do the lower sets of blades 13 of the same pair of members 11. As can be seen in FIG. 9 of the drawings, the members 11 in the co-operating pairs are angularly displaced from one another by substantially 45° around the corresponding axes of rotation so that, during operation, the blades 13 intermesh in the regions of overlap between the members without fouling one another despite being at the same substantially horizontal levels. As in the preceding embodiment, the axes of rotation that correspond with the longitudinal axes of the shafts 5 are coincident with the longitidinal axes of the stub shafts 20 (and those of the stub shafts 15 in the preceding embodiment).

In the use of the machine when converted in the manner illustrated in FIGS. 7 to 9 of the drawings, the moving blades 13 co-operate with the knife edges of the further stationary members 45 in cutting and chopping standing stalks and the like. The use of the construction which has been described with reference to FIGS. 7 to 9 of the drawings is particularly convenient for the cutting and chopping of the standing stalks of crops that are grown in rows with distances of, for example, substantially 75 to substantially 100 centimeters between the rows. Cotton, tobacco and maize are examples of crops that are usually grown in that manner and the converted machine is, accordingly, particularly but not exclusively suitable for post-harvest cutting and chopping operations with such crops. Crop guides equivalent to the previously described guides 31 are not required with the embodiment of FIG. 7 to 9 of the drawings because the blades 13 move constantly to the rear with respect to the direction A in their regions of co-operation with the members 45 at which cutting and/or chopping actually takes place so that automatic displacement of the cut and/or chopped stalks or other crop to the rear follows.

In both of the embodiments which have been described, the levels of the cutting or mowing members above the ground can be adjusted as required by raising or lowering the level of the axis of rotation of the roller 41 with respect to the level of the frame part 1. The mowing, cutting and/or chopping machine that is produced when a conversion of the kind that has been described has been undertaken is capable of dealing with the stalks of crops of many kinds and particularly crops such as cabbages and other members of the brassica family, cotton, tobacco and maize. The cut-down and chopped stalks are brought to a condition in which they can easily be buried in the soil and in which they will then decay readily. The speed of rotation of the cutting or mowing members 11 can be adjusted for optimum efficiency having regard to the crop that is to be dealt with and the general operating conditions by employing an appropriate pair of co-operating pinions in the change-speed gear 34. When required, the cutting and/or chopping capacity of the machine can be increased by providing more blades 13 at additional levels as has been described with reference to FIG. 5 of the drawings.

Although various features of the machines or implements that have been described and that are illustrated in the accompanying drawings and various steps in the conversion of such implements or machines from one function to another will be set forth in the following claims as inventive features, it is emphasised that the invention is not necessarily limited to those features and that it includes within its scope every part of each implement or machine that has been described and/or illustrated in the accompanying drawings and every step in the methods of conversion that have been described and/or illustrated both individually and in various combinations.

What we claim is:

1. A convertible agricultural implement comprising a frame movable over the ground and a plurality of substantially horizontal tool supports being positioned side-by-side in a row that extends transverse to the normal direction of travel, each of said supports being rotatable about a corresponding upwardly extending shaft and driving means connected to the shafts to rotate adjacent shafts in opposite directions, the opposite ends of each of said supports having sleeve-like holders that are releasably connectable to downwardly extending soil-working tools, horizontally extending cutting blades being secured to the holders of alternate ones of said supports to convert the implement from a soil-working implement with all supports having tools that work overlapping strips of soil to a cutting implement, at least one of said alternate supports having at least two sets of cutting blades that are vertically spaced apart from another so that the blades of one set project at different horizontal levels than the blades of a second set, the length of said cutting blades exceeding at least half the distance between those shafts about which said alternate supports are rotatable and the outer tips of said blades tracing circles that substantially overlap the circles traced by the outer tips of those blades on neighboring alternate supports, the blades on neighboring alternate supports being positioned to intersect and cooperate with one another during cutting operation.

2. A convertible implement as claimed in claim 1, wherein a drive transmission to said supports includes a change-speed gear that imparts different speeds of rotation of said supports.

3. A convertible implement as claimed in claim 1, wherein a rotary ground engaging supporting member is positioned to the rear of said supports with respect to the normal direction of travel, said supporting member being pivotably connected to said frame with arms and the positions of said arms being adjustable to govern the operative positions of said cutting blades.

4. A convertible implement as claimed in claim 1, wherein said cutting blades have cutting edges that are rotatable through circular paths that overlap each other throughout substantially the whole lengths of said edges.

5. A convertible implement as claimed in claim 1, wherein a second support of two neighboring alternate supports has a single set of blades that extends at a level between the two sets of blades that extend at different levels on said one support.

6. A convertible implement as claimed in claim 1, wherein said one support has two sets of blades that extend at two spaced apart levels and are positioned to cooperate with three sets of blades that extend at three spaced apart levels and are secured to a neighboring alternate support.

7. A convertible implement as claimed in claim 1, wherein said shafts are spaced apart from one another by about 25 centimeters and there are at least four of said supports.

8. A convertible implement as claimed in claim 1, wherein further cutting elements are rigidly fixed in position on said frame and said further elements extending adjacent and between between neighboring cutting blades.

9. A convertible implement as claimed in claim 8, wherein each further element has knife edges positioned between said neighboring cutting blades.

10. A convertible implement as claimed in claim 8, wherein each further element is triangular in configuration when seen in plan view and the apex of said element is directed forwardly with respect to the normal direction of travel.

11. A convertible implement as claimed in claim 1, wherein the leading edge of each cutting blade is a knife edge which terminates in and is curved adjacent an outer tip.

12. A convertible implement as claimed in claim 11, wherein part of the knife edge of each blade extends rearwardly with respect to its normal direction of rotation.

13. A convertible implement as claimed in claim 1, wherein there are four cutting blades in each set and the four blades extend in cruciform relationship when viewed in plan.

14. A convertible implement as claimed in claim 13, wherein each set of cutting blades is mounted on a plate and the latter is connected to a corresponding shaft.

15. A convertible implement as claimed in claim 14, wherein said one alternate support is connected to a plurality of plates and each plate has a set of four cutting blades.

16. A convertible implement as claimed in claim 15, wherein each plate is connected by said fastening means to its corresponding support.

17. A convertible implement as claimed in claim 16, wherein said fastening means includes tine holders at opposite ends of said supports and stub shafts are connected to said supports and retained in fixed positions relative to said holders by bolts and cooperating clamps.

18. A convertible implement as claimed in claim 17, wherein each plate is directly secured to a cooperating holder by said bolts and said clamps.

19. A convertible implement as claimed in claim 14, wherein each plate is circular in configuration and has a diameter about half that of a circle traced by said tips of the cutting blades.

20. A convertible implement as claimed in claim 1, wherein guides for crop are supported on said frame and said guides extend in front of said blades with respect to the direction of travel, said guides having guide surfaces that extend substantially parallel to said direction.

21. A convertible implement as claimed in claim 20, wherein said guides are located about midway between neighboring alternate supports.

22. A convertible implement as claimed in claim 21, wherein said guides have rear ends that are located behind the forward extent of the rotary paths of said cutting blades during rotation thereof with respect to the normal direction of travel.

23. A convertible implement as claimed in claim 22, wherein said rear ends are located adjacent the intersection of the circular paths of neighboring cutting blades when the implement is viewed in a direction parallel to the axes of rotation of said supports.

* * * * *